United States Patent [19]

Yamamoto et al.

[11] Patent Number: 5,228,834
[45] Date of Patent: Jul. 20, 1993

[54] HUB STRUCTURE FOR A ROTARY WING AIRCRAFT

[75] Inventors: Keizou Yamamoto, Tokorozawa; Takahiro Ichihashi; Kanehiro Hanayama, both of Tachikawa; Shunichi Bandoh; Asao Kakinuma, both of Kakamigahara; Tadashi Wakatsuki, Seki, all of Japan

[73] Assignees: Kawasaki Jukogyo Kabushiki; Japan as Represented by Director General, Technical Research & Development Institute, Japan Defence Agency, Tokyo, Japan

[21] Appl. No.: 685,646

[22] Filed: Apr. 16, 1991

[30] Foreign Application Priority Data

Apr. 27, 1990 [JP] Japan .................................. 2-113919

[51] Int. Cl.⁵ .............................................. B63H 1/06
[52] U.S. Cl. .................................. 416/131; 416/134 R; 416/134 A; 416/141; 416/140
[58] Field of Search ................ 416/131, 134 R, 134 A, 416/141 R, 142, 140 A, 143; 384/203, 204, 221

[56] References Cited

U.S. PATENT DOCUMENTS

| | | | |
|---|---|---|---|
| 2,652,293 | 9/1953 | Phillips | 384/204 |
| 4,273,511 | 6/1981 | Moville et al. | 416/141 X |
| 4,547,127 | 10/1985 | Frommlet et al. | 416/141 X |
| 4,588,355 | 5/1986 | Ferris et al. | 416/134 A X |
| 4,676,720 | 6/1987 | Niwa et al. | 416/134 A |
| 4,690,616 | 9/1987 | Hahn et al. | 416/140 A X |
| 4,778,343 | 10/1988 | Hahn et al. | 416/140 A X |
| 4,786,236 | 11/1988 | Hahn et al. | 416/143 |
| 4,893,988 | 1/1990 | Sato | 416/134 A X |
| 5,059,094 | 11/1991 | Robinson et al. | 416/134 A |

Primary Examiner—Edward K. Look
Assistant Examiner—Todd Mattingly
Attorney, Agent, or Firm—Kerkam, Stowell, Kondracki & Clarke

[57] ABSTRACT

A bearingless hub structure for a rotary-wing aircraft is provided, the structure including a hub body adapted to be securely connected to a rotor mast, a plurality of flexible beam members provided integrally with the hub body to extend radially outwardly, a pitch housing encircling each of the flexible beam members, and having a radially outward end portion which is rigid with a radially inward end portion of a rotor blade, a spherical bearing positioned adjacent to a radially inward end portion of the flexible beam member for supporting the pitch housing, a lead-lag damper positioned between the flexible beam member and the pitch housing, and the flexible beam members each having a flexible plate portion which is of a low bending rigidity in a flapping direction, a flexible portion provided radially outwardly of the flexible plate portion having a low bending rigidity in the lead-lag direction, and a twist-flex portion provided radially outwardly of the flexible portion. The flexible portion has two beam sections which have radially outward end portions integrally connected with a radially inward end portion of a twist-flex portion, with the radially inward end portions of the beam sections being removably connected to a radially outward end portion of the flexible plate portion at a plurality of circumferentially spaced positions.

4 Claims, 6 Drawing Sheets

HUB STRUCTURE FOR A ROTARY WING AIRCRAFT

BACKGROUND OF THE INVENTION

1. Field of the Invention

The present invention relates to a hub structure of a rotary-wing aircraft, and more particularly to a bearingless hub structure of a rotary-wing aircraft.

2. Prior Art

A bearingless hub structure of a rotary-wing aircraft generally includes a hub body having a plurality of radially extending flexible beams provided with flexible plate sections having a low rigidity in the flapping direction. Each of the flexible plate sections is connected or made continuous with a flexible portion which is flexible in the lead-lag direction. The flexible beam also has a twist-flex portion which is of a low torsional rigidity. As disclosed by the Japanese laid-open patent application No. 61-21894 which has been laid-open to public inspection on Jan. 30, 1986, the flexible plate section, the flexible portion and the twist-flex portion are formed in radially offset positions with each other so that Coupling between the lead-lag movements and the pitch changing movements can be eliminated. With this arrangement, it is possible to obtain a design flexibility.

The U.S. Pat. No. 4,676,720 discloses a structure which is an improvement of the structure disclosed by the laid-open patent application No. 61-21894 to obtain an improved damping characteristics. More specifically, as described in the aforementioned U.S. patent, the structure disclosed by the application 61-21894 has a tendency that the flexible beam is bent in an S-shaped configuration so that it is impossible to provide a satisfactory damping property in the lead-lag direction. As the result, it becomes difficult to prevent a instability on the ground and in the air.

In view of the problems, the U.S. patent proposes to provide the flexible portion which has a low rigidity in the lead-lag direction with two beam portions which are spaced apart at the radially inner ends in the lead-lag direction and decreased in the spacing toward radially outward direction. The beam portions are located radially inwardly with respect to the twist-flex portion and has radially outward ends which are continuously formed with the radially inner end of the twist-flex portion. The rotor blades are connected at the radially inner ends by means of a plurality of bolts to the radially outer end of the pitch housing.

In rotary-wing aircrafts, it is necessary to fold the rotor blades when they are brought into hangers. For the purpose, in the aforementioned structure, the bolts connecting each of the rotor blades to the pitch housing are removed except one bolt about which the rotor blade is turned so that the rotor blade is placed along the longitudinal axis of the aircraft in a position wherein the rotor blade does not extend laterally beyond the contour of the aircraft.

It should however be noted that in this structure the rigidity at the connection between the rotor blade and the pitch housing will be decreased in the lead-lag direction to an extent that a distortion may be produced at this connection under a lead-lag movement. Such distortion may cause a decrease in the effective stroke of the lead-lag damper so that there may be lack of damping capability. A further problem encountered in this structure is that the connection between the rotor blades and the pitch housing requires connecting bolts of a substantial size and huge fittings so that the structure becomes bulky and causes an increased aeronautical drag and weight. It should further be noted that when the rotor blades are being folded as described above, there may be a possibility that the rotor blades may be accidentally dropped in handling. If such accident occurs, the twist-flex portion of the flexible beam section may be excessively twisted to an extent that the portion may be broken.

In order to eliminate the problem, the flexible beam may be separated from the hub body at a portion radially inward of the flexible plate portion which has a low rigidity in the flapping direction and connected with the hub body through connecting bolts. This structure however has disadvantages. First, it should be noted that the portion radially inward the flexible plate portion. is subjected to a large bending load in the flapping direction due to the flapping movements. The connection at this portion therefore requires huge fittings which can withstand the bending load. Further, the connection provided in this portion will cause an interference between the rotor blades when the blades are to be folded.

SUMMARY OF THE INVENTION

It is therefore an object of the present invention to provide a hub structure of a rotary-wing aircraft in which the aforementioned drawbacks are eliminated.

Another object of the present invention is to provide a bearingless hub structure of a rotary-wing aircraft which can provide a sufficient stroke in the lead-lag damper.

A further object of the present invention is to provide bearingless hub structure of a rotary-wing aircraft in which connecting structure can be made compact.

Still further object of the present invention is to provide a bearingless hub structure of a rotary-wing aircraft i which the blades connected with the hub structure can be conveniently folded.

According to the present invention, the above and other objects can be accomplished by providing a hub structure with radially outwardly extending flexible beam means including a flexible plate portion having a low bending rigidity in a flapping direction, a flexible section provided radially outwardly of the flexible plate portion and having a low bending rigidity in lead-lag direction, and a twistflex portion provided radially outwardly of the flexible section and having a low torsional rigidity. The flexible portion includes two beam sections having radially inward end portions spaced apart in the lead-lag direction, the spacing between the beam sections being decreased toward radially outward. The radially outward ends of the beam sections are integrally connected with a radially inward end of the twist-flex portion. The beam sections of the flexible portion are connected in a removable manner at the radially inward ends with the radially outward end of the flexible plate portion at least at two points by means of vertically extending pins.

According to a preferable aspect of the present invention, damper means may be positioned between the two beam sections of the flexible portion and spherical bearing means may be provided in the damper means for connecting a pitch housing to the hub structure. According to a further aspect of the present invention, the pitch housing may be provided at a position corresponding to a space between the two beam sections with support means having pivot shaft means which is inserted into the spherical bearing means.

According to the present invention, it becomes possible to form a rotor blade integral with the pitch housing. Where advisable, the rotor blade may be formed separately from and connected to the pitch housing. However, the connection between the rotor blade and, the pitch housing may not necessarily be removable. Therefore, the connection between the rotor blade and the pitch housing does not cause any problem in respect of the rigidity in the lead-lag direction. Further, no huge fittings will be required in the connection. The flexible beam means includes pin connections between the radially inner end portion of the flexible portion having a low rigidity in the lead-lag direction and the radially outer end portion of the flexible plate portion having a low rigidity in the flapping direction. It is therefore possible to fold the rotor blade by removing the connecting pins leaving one connecting pin so that the rotor blade can be turned about the connecting pin which is left in the position. The connection between the flexible portion and the flexible plate portion is located radially inward with respect to the flexible portion which produces a deflection in the lead-lag direction. Therefore, the rigidity of the connection does not have serious effect on the lead-lag deflection at the flexible portion. It is therefore possible to provide a lead-lag damper with an adequate stroke by locating the damper at or in the vicinity of the flexible portion. By locating the connection in the flexible beam means radially outward the flexible plate portion, it is possible to avoid mutual interference between the rotor blades when the rotor blades are being folded.

According to the aforementioned preferable aspect of the present invention, the lead-lag damper means is located between the two beam sections of the flexible beam means and the spherical bearing means is located in the lead-lag damper means for connecting the pitch housing to the hub structure. In this structure, it is possible to house the lead-lag damper means in the space within the confine of the flexible portion. This will make the entire structure compact. In the arrangement wherein the pitch housing is provided with the support means at a position corresponding to the space between the two beam sections and the support means is provided with pivot shaft means which is inserted into the spherical bearing means for connecting the pitch housing with the spherical bearing means, it is possible to make the overall structure compact and light in weight. The connection between the flexible portion and the flexible plate portion of the flexible beam means allows a slight rotational displacement so that a part of the lead-lag displacement is absorbed by this rotational displacement. This will serve to decrease the bending stress at the beam sections of the flexible portion. It is therefore possible to decrease the length of the beam sections. The above and other objects and features of the present invention will become apparent from the following description of a preferred embodiment taking reference to the accompanying drawings.

DESCRIPTION OF THE PREFERRED EMBODIMENT

Figure 1:
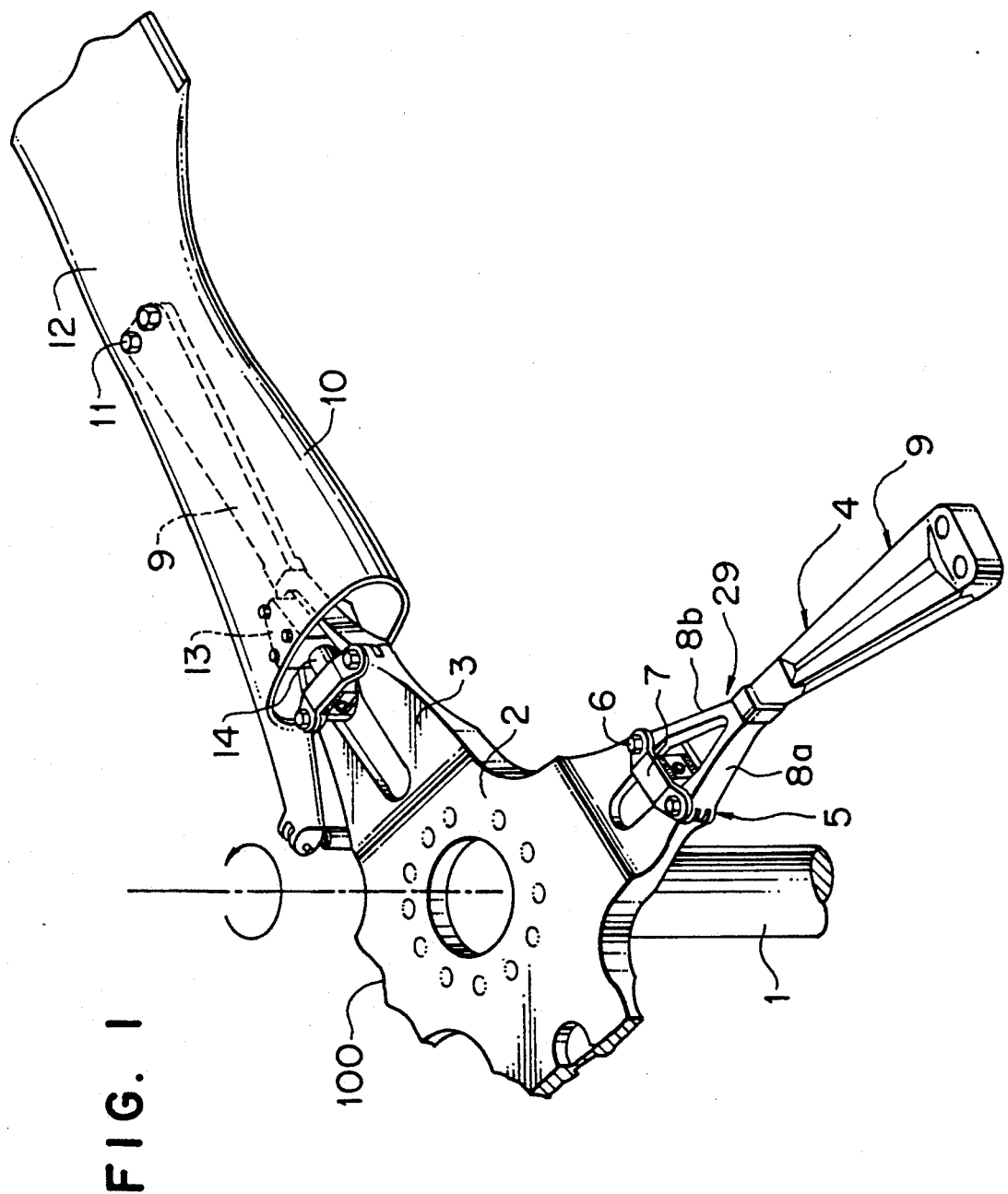
FIG. 1 is a perspective view of a hub structure of a rotary-wing aircraft in accordance with the present invention.

Referring to the drawings, particularly to FIG. 1, there is shown a bearingless hub structure 100 which includes a rigid hub body 2 secured to the upper end of a rotatable shaft or mast 1. The hub body 2 is formed with four flexible beam members 4 which are circumferentially spaced apart from each other by an angle of 90°. Each of the flexible beam members 4 is formed integrally with the hub body 2 and includes a flexible plate portion 3 which is located at a radially inward portion of the flexible beam member 4. The flexible plate portion 3 is of a flat configuration and extends in substantially horizontal direction to provide flapping movements. The flexible beam member 4 further includes a flexible portion 29 which is located radially outward the flexible plate portion 3. The flexible portion 29 is constituted by a pair of beam sections 8a and 8b which are circumferentially spaced apart from each other. The circumferential spacing between the two beam sections 8a and 8b are decreased from the radially inward portion toward radially outward to form a substantially triangular configuration. The flexible portion 29 has the least rigidity in the lead-lag direction to provide lead-lag movements. Radially outside the flexible portion 29, the flexible beam member 4 is again expanded in width toward radially outward to form a twist-flex portion 9. The twist-flex portion 9 provides feathering movements.

The flexible portion 29 and the twist-flex portion 9 are formed integrally with each other. The flexible portion 29 is connected at a connecting portion 5 with the flexible plate portion 3 by means of pins 6. It will therefore be understood that the flexible beam member can be disassembled by removing the pins 6.

Figure 2:
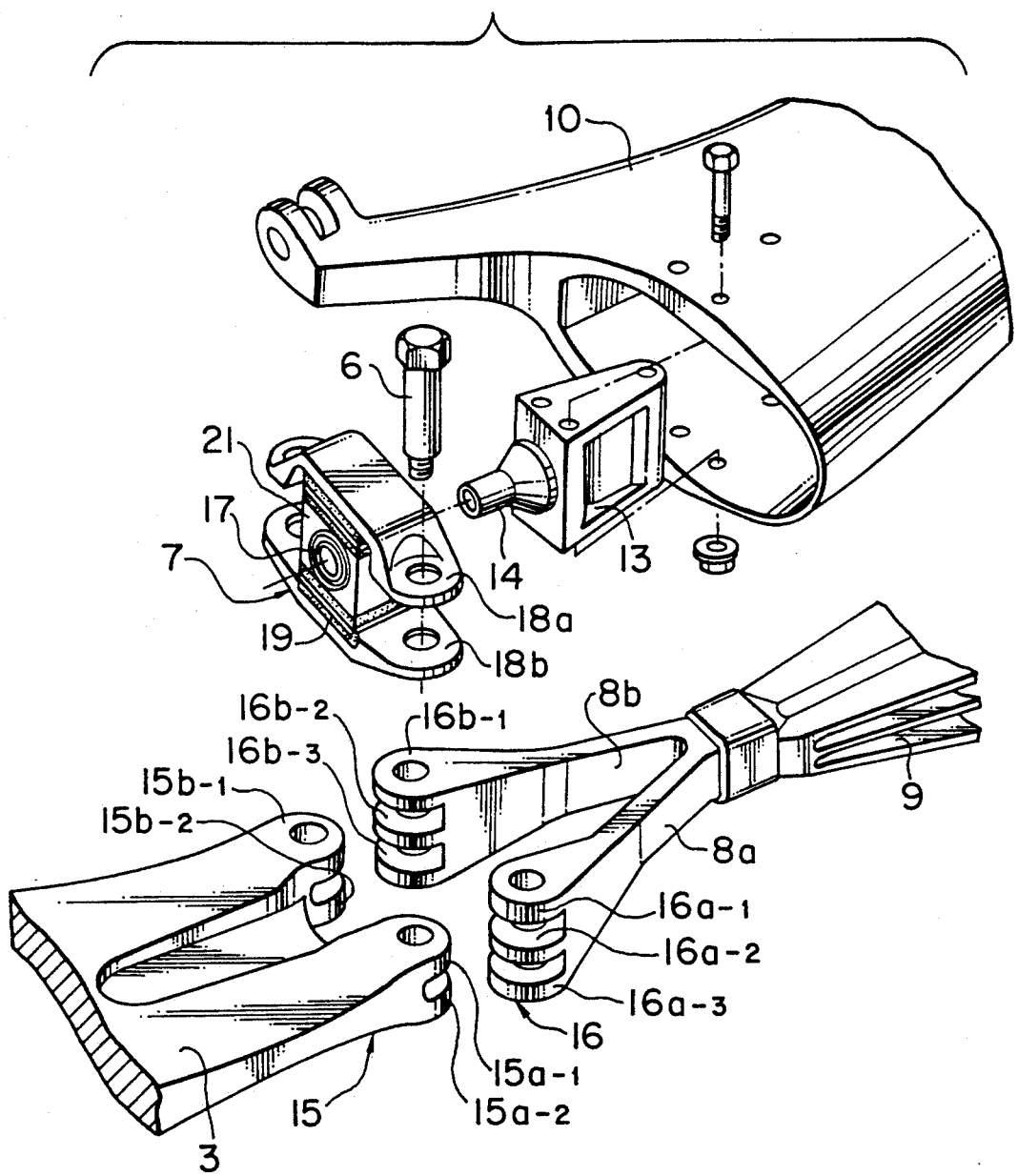
FIG. 2 is an exploded perspective view of the hub structure shown in FIG. 1.
Figure 3:
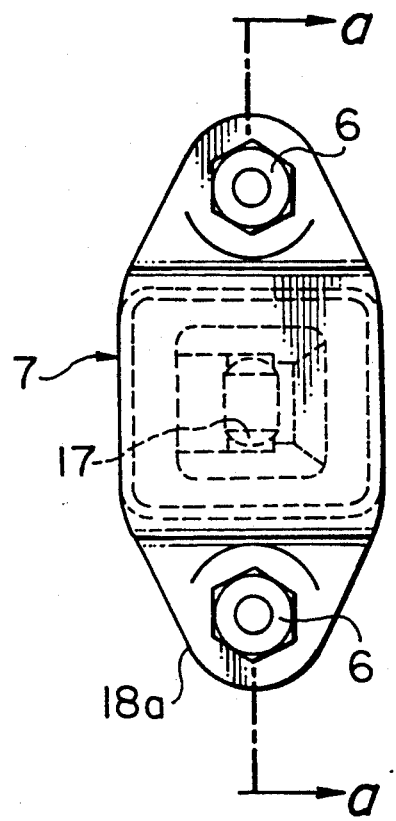
FIG. 3 is a plan view of an elastomeric damper which is used in the hub structure of FIG. 1.
Figure 4:
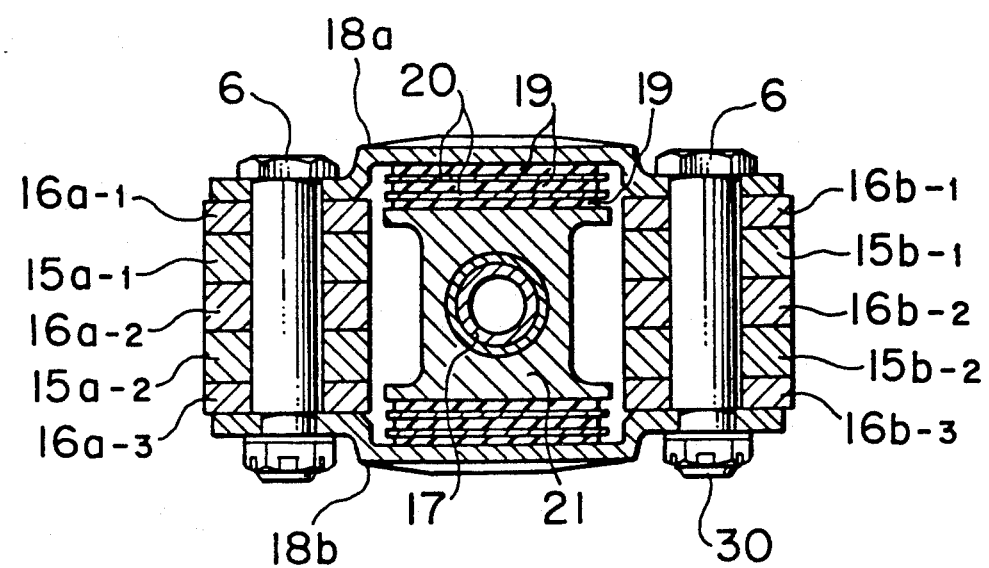
FIG. 4 is a sectional view taken along a line a—a in FIG. 3.

The connecting portion 5 includes as shown in FIGS. 2 through 4 connecting lugs 15 formed on the radially outward end portion of the flexible plate portion 3 and connecting lugs 16 formed on the radially inward end portions of the beam sections 8a and 8b. The connecting lugs 15 and 16 include a plurality of lug elements 15a-1, 15a-2, 15b-1, 15b-2, 16a-1, 16a-2, 16a-3, 16b-1, 16b-2, and 16b-3. The lug elements 15a-1 and 15a-2 are engaged with the lug elements 16a-1, 16a-2 and 16a-3, whereas the lug elements 15b-1 and 15b-2 are engaged with the lug elements 16b-1, 16b-2 and 16b-3.

An elastomeric damper assembly 7 is disposed in the connecting portion 5 for providing a damping action in the lead-lag direction. The elastomeric damper 7 includes an upper support plate 18a, a lower support plate 18b and a plurality of intermediate plates 20. Sheets 19 of elastomeric material are interposed between and adhered to the plates 18a, 18b and 20. A support block 21 is interposed between the intermediate plates 20 with a sheet 21 of the elastomeric material disposed at each side of the support block 21. The support block 21 supports a spherical bearing 17 which is provided in the block 17. The support plates 18a and 18b are provided at the opposite end portions with holes for receiving the pins 6. As shown in FIGS. 1 and 2, the damper 7 is located in the space between the beam sections 8a and 8b. The upper plate 18a is located over the lug elements 16a-1 and 16b-1 whereas the lower plate 18b is located beneath the lug elements 16a-3 and 16b-3 so that the holes in the plates 18a and 18b are axially aligned with the holes in the lug elements. The pins 6 are inserted through the holes in the plates 18a and 18b and the lug elements to connect the flexible plate 3 to the beam sections 8a and 8b.

As shown in FIG. 4, the pin 6 is of a stepped configuration and has a small diameter portion at the lower end. The small diameter portion is inserted into the hole of the lower plate 18b. It will therefore be understood that when a nut 30 is tightened onto the pin 6 the lower plate 18b is firmly engaged with the step portion between the large diameter portion and the small diameter portion of the pin 6. In this position, the elastomeric material of the sheets 19 is subjected to a compression stress. The pre-compression thus applied to the elastomeric material is effective to prevent a decrease in the fatigue resistance of the material under a oscillating load. This structure is also effective to prevent the lug elements 15 and 16 from being subjected to vertical bending loads.

Loads on the spherical bearing 17 is transmitted from the support block 21 through the elastomeric sheets 19 to the support plates 18a lad 18b and then through the pins 6 to the flexible beam member 4. The sheets 19 of the elastomeric material are interlaced between the plates 18a, 18b and 20 so that it is rigid in the vertical or flapping direction and resilient in the rotational or lead-lag direction. The elastomeric material has a large damping property so that it can provide a substantial damping characteristics against the lead-lag movements.

Referring now to FIGS. 1 and 2, it will be noted that a pitch housing 10 is formed integrally with a rotor blade 12. The pitch housing 10 has a radially inward end portion which is provided at a circumferentially intermediate portion with a block member 13 which has a radially inwardly extending pivot shaft 14. The pivot shaft 14 is inserted into a radially extending bore formed in the spherical bearing 17 so that a lead-lag movement of the rotor blade 12 is transmitted to the elastomeric damper 7.

Figure 5:
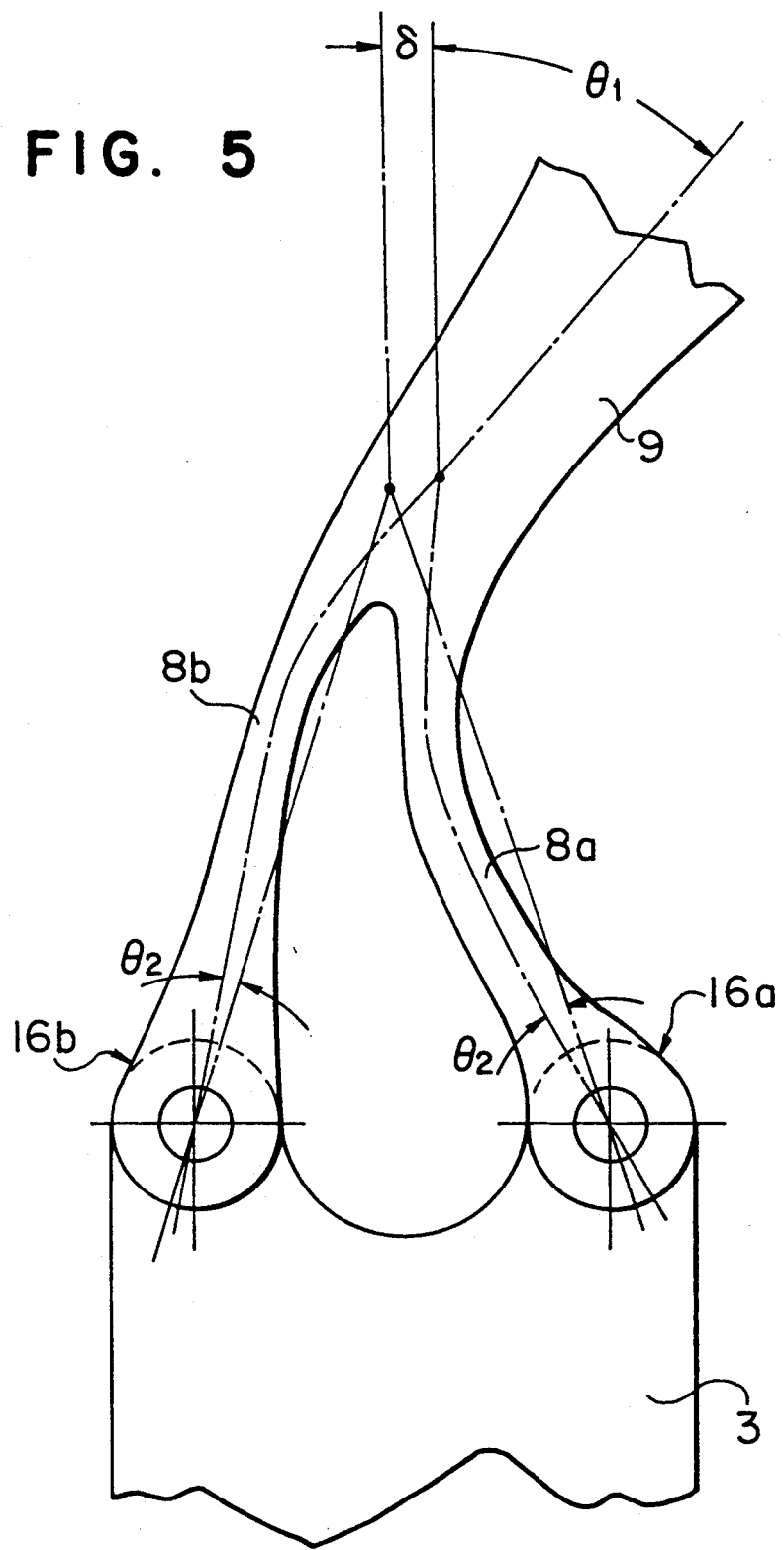
FIG. 5 is a plan view of the flexible portion showing the beam sections in deformed positions.

The rotor blade 12 is connected with the flexible beam member 4 at the radially outward end portion of the member 4 by means of pins 11. Thus, centrifugal force produced in the rotor blade 12 is transmitted through the pins 11 to the flexible beam member 4. Referring to FIG. 5, it will be noted that a lead-lag movement of the rotor blade 12 causes a deflection in the twist-flex portion 9 of the flexible beam member 4. The deflection of the portion 9 produces a translational displacement in the lead-lag direction as shown by $\delta$ in FIG. 5 and an angular displacement $\theta_1$. The beam sections 8a and 8b are bent as shown and subjected to a tensile and compression stresses. Since the beam sections 8a and 8b are formed of a composite material so that they have a greater rigidity against the compression and the tension but have a less rigidity against the bending deformation. With this property of the composite material, the flexible portion 29 provides the least rigidity against the rotational lead-lag displacement and greater rigidity against the translational lead-lag displacement.

Since the beam sections 8a and 8b are connected with the flexible plate portion 3 through the lug structure 16, a slight angular displacement is allowed in this connection. More specifically, when the twist-flex portion 9 produces the angular displacement $\theta_1$, there is produced in each of the connecting portions 16a and 16b an angular displacement $\theta_2$. It will therefore be understood that the connection between the beam sections 8a and 8b and the flexible plate portion 3 provides an increased angular lead-lag displacement as compared with an arrangement wherein the beam sections are rigidly connected with the flexible plate portion. The angular displacement $\theta_2$ is also effective to decrease the bending stress to a substantial extent so that it becomes possible to shorten the beam sections 8a and 8b. As the result, the hub structure can be made compact and light in weight.

In the specific structure wherein the rotor blade 12 is integral with the pitch housing 10, the rigidity in the lead-lag direction can be substantially increased as compared with a structure wherein these portions are separately made and connected together by means of fittings. It will therefore be understood that this specific structure of the present invention can provide a sufficient extent of damping effect with an elastomeric damper of a smaller size. In the prior art structure, there has been problems in that deformations and displacements are produced in the twist-flex portion and the connection between the rotor blade and the pitch housing and such deformation and the deflections have caused a decrease in the lead-lag movements to thereby decrease the effective stroke of the lead-lag damper. The structure of the present invention is effective to eliminate or substantially decrease the problems.

As shown in FIG. 2, the block member 13 and the elastomeric damper 7 are disposed in a space encircled by the beam members 8 and the lugs 16. With this arrangement, it is possible to obtain a compact and light hub structure.

Figure 6:
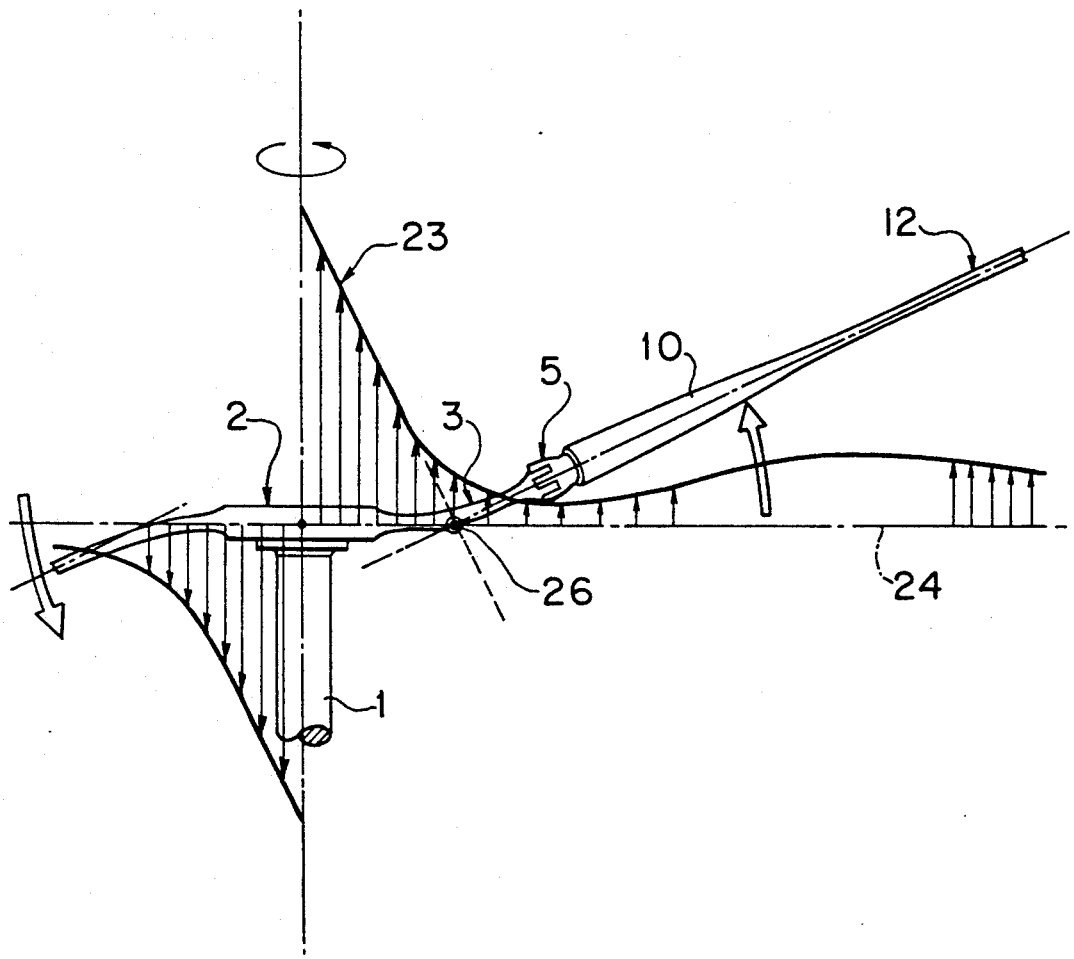
FIG. 6 is a diagram showing the bending moment distribution along the rotor blade through the flexible plate portion; and, FIG. 7 is a plan view showing the rotor blades in folded positions.

Referring to FIG. 6, there is shown a load distribution in the hub structure. At the connection with the rotor mast 1, there is produced a bending moment of the maximum value. Under a lift force which is produced in the rotor blade 12, the rotor blade 12 is swung upward to produce a flapping movement. The axis of the rotor blade 12 intersects the plane 24 of the hub structure which is perpendicular to the axis of the rotor mast 1 at a point 26. Thus, the rotor blade 12 in appearance makes a flapping movement about the point 26 so that the point 26 may be referred to as the equivalent flapping hinge. The bending moment decreases from the center of the hub structure toward the equivalent flapping hinge 26 and then increase again toward radially outwards. The equivalent flapping hinge 26 is located in a substantially center portion of the flexible plate portion 3 so that the connecting lug structure 5 is located in a position where the bending moment is the smallest. Thus, it is possible to make the connecting lug structure compact.

Figure 7:
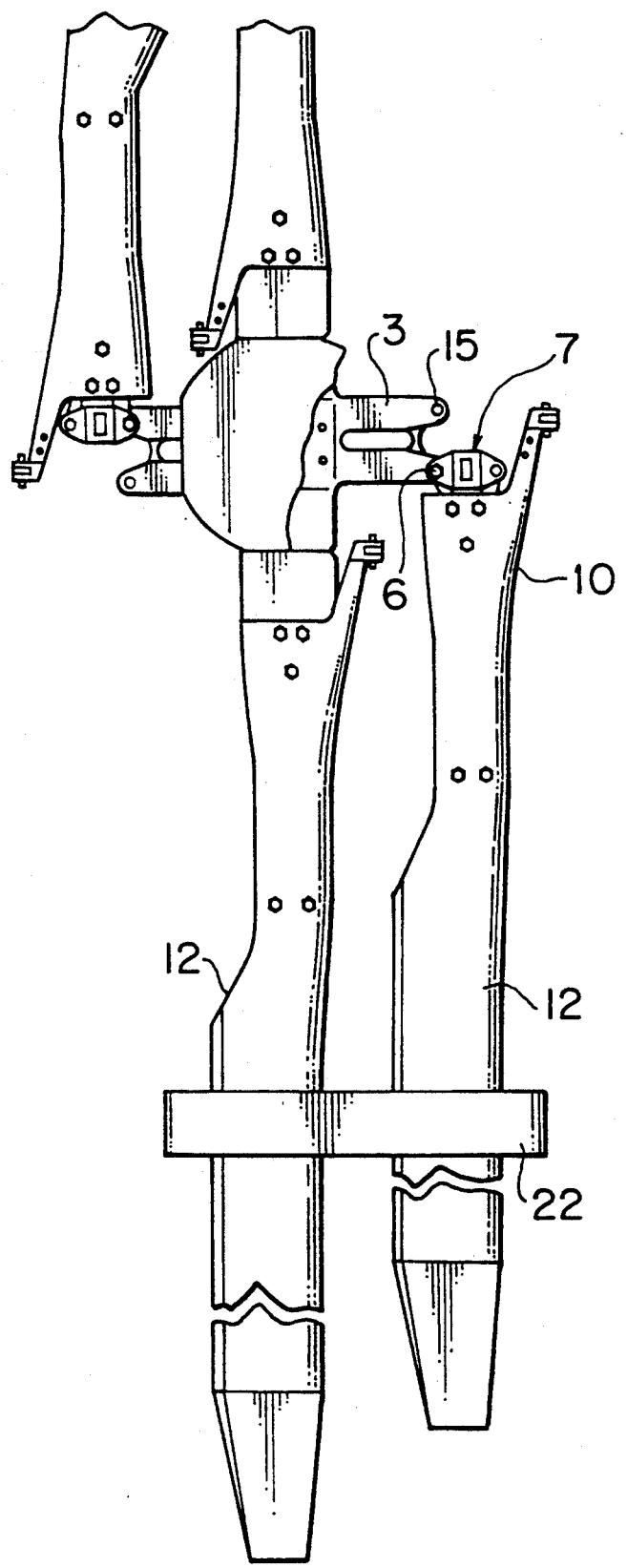

According to the hub structure of the present invention, the rotor blades 12 can be folded as shown in FIG. 7. In FIG. 7, diametrically opposite two of the four rotor blades 12 are folded to extend along the remaining two. More specifically, in each of the rotor blades 12 which are to be folded, one of the connecting pins 6 is removed and the blade 12 is turned about the other connecting pin 6 for 90°. A blade clamp 22 is provided to hold the rotor blade 12 in the folded position. According to the structure of the present invention, it is possible to avoid the twist-flex portion 9 being subjected to the weight of the rotor blade 12 when the rotor blade 12 is being folded.

The invention has thus been shown and described with reference to a specific embodiment, however, it should be noted that the invention is in no way limited to the details of the illustrated structures but changes and modifications may be made without departing from the scope of the appended claims.

We claim:

1. A bearingless hub structure of a rotary wing aircraft including a hub body which is adapted to be connected with a rotor mast, a plurality of flexible beam members provided integrally with the hub body to extend radially outward, a pitch housing encircling each of said flexible beam members with a spacing therebetween, said pitch housing having a radially outward end portion which is rigid with a radially inward end portion of a rotor blade, spherical bearing means provided adjacent to a radially inward end portion of said flexible beam member for supporting a radially inward end portion of said pitch housing, lead-lag damper means provided between said flexible beam member and said pitch housing for providing a damping function in a lead-lag direction, the improvement comprising that said flexible beam member includes a flexible plate portion which is of a low bending rigidity in a flapping direction, a flexible portion provided radially outward said flexible plate portion and of a low bending rigidity in the lead-lag direction and a twist-flex portion provided radially outward said flexible portion, said flexible portion being consisted of two beam sections which have radially inward end portions spaced apart in the lead-lag direction with a spacing which decreases toward radially outward, said beam sections having radially outward end portions integrally connected with a radially inward end portion of said twist-flex portion, said radially inward end portions of said beam sections being formed with lug means removably connected through bolt means with correspondingly formed lug means in a radially outward end portion of said flexible plate portion oat a plurality of positions spaced apart in the lead-lag direction, said damper means including upper and lower elastomeric dampers attached respectively to upper and lower surface portions of said spherical bearing means, said upper elastomeric damper having a support plate attached to an upper surface portion of said upper elastomeric damper and extending in the lead-lag direction, said lower elastomeric damper having a support plate attached to a lower surface portion of said lower elastomeric damper and extending in the lead-lag direction, said support plates of said upper and lower elastomeric dampers being connected to said flexible beam member at said lug means through said bolt means, and said pitch housing being provided with support means having a radially inwardly extending pivot shaft which is inserted into said spherical bearing means.

2. A hub structure in accordance with claim 1 in which said damper means is disposed in a space between said beam sections.

3. A hub structure in accordance with claim 1 in which said damper means includes a plurality of plates with a sheet of elastomeric material interposed between each adjacent two of said plates.

4. A hub structure in accordance with claim 3 in which said spherical bearing means is located between adjacent two of said plates of said damper means with a sheet of elastomeric material interposed between each one of said plates and said spherical bearing means.

* * * * *

UNITED STATES PATENT AND TRADEMARK OFFICE
CERTIFICATE OF CORRECTION

PATENT NO. : 5,228,834
DATED : July 20, 1993
INVENTOR(S) : YAMAMOTO ET AL.

It is certified that error appears in the above-indentified patent and that said Letters Patent is hereby corrected as shown below:

On the cover page, the Assignee, "Kawasaki Jukogyo Kabushiki" should be --Kawasaki Jukogyo Kabushiki Kaisha--.

Col. 8, line 7, (Claim 1), "oat" should be --at--.

Signed and Sealed this

Fourteenth Day of March, 1995

Attest:

BRUCE LEHMAN

Attesting Officer       Commissioner of Patents and Trademarks

UNITED STATES PATENT AND TRADEMARK OFFICE
CERTIFICATE OF CORRECTION

PATENT NO. : 5,228,834
DATED : July 20, 1993
INVENTOR(S) : YAMAMOTO ET AL.

It is certified that error appears in the above-indentified patent and that said Letters Patent is hereby corrected as shown below:

On the cover page, the Assignee, "Kawasaki Jukogyo Kabushiki" should be --Kawasaki Jukogyo Kabushiki Kaisha--.

Signed and Sealed this

Eighteenth Day of April, 1995

Attest:

BRUCE LEHMAN

Attesting Officer

Commissioner of Patents and Trademarks